US 6,724,566 B2

(12) United States Patent
Kant et al.

(10) Patent No.: US 6,724,566 B2
(45) Date of Patent: Apr. 20, 2004

(54) ACOUSTIC DAMPER FOR A DISC DRIVE

(75) Inventors: Rishi Kant, Boulder, CO (US); Menachem Rafaelof, Superior, CO (US); Michael Alan Maiers, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 114 days.

(21) Appl. No.: 10/104,572

(22) Filed: Mar. 21, 2002

(65) Prior Publication Data

US 2003/0058572 A1 Mar. 27, 2003

Related U.S. Application Data

(60) Provisional application No. 60/324,395, filed on Sep. 24, 2001.

(51) Int. Cl.[7] .............................................. G11B 17/02
(52) U.S. Cl. ................................................... 360/97.01
(58) Field of Search ........................ 360/97.01, 97.02, 360/97.03, 97.04

(56) References Cited

U.S. PATENT DOCUMENTS

| | | | |
|---|---|---|---|
| 4,367,503 A | 1/1983 | Treseder ...................... 360/98 |
| 4,791,508 A | 12/1988 | Augeri et al. ............. 360/99.12 |
| 4,814,925 A | 3/1989 | Beaujean ..................... 360/132 |
| 4,870,703 A | 9/1989 | Augeri et al. ............ 360/98.07 |
| 4,974,103 A | 11/1990 | Iftikar et al. ............. 360/97.01 |
| 5,282,100 A | 1/1994 | Tacklind et al. ......... 360/97.02 |
| 5,376,850 A | 12/1994 | Elsing et al. ............. 310/67 R |
| 5,422,766 A | 6/1995 | Hack et al. .............. 360/97.02 |
| 5,454,157 A | 10/1995 | Ananth et al. ................. 29/603 |
| 5,461,268 A | 10/1995 | Sanada ........................ 310/51 |
| 5,483,398 A | 1/1996 | Boutaghou ............... 360/97.02 |
| 5,761,184 A | 6/1998 | Dauber et al. .............. 369/247 |
| 5,781,373 A | 7/1998 | Larson et al. ............ 360/97.02 |
| 6,175,469 B1 * | 1/2001 | Ahmad et al. ........... 360/97.02 |
| 6,256,165 B1 | 7/2001 | Kim ....................... 360/97.01 |
| 6,473,263 B2 * | 10/2002 | Jang et al. ............... 360/97.01 |
| 6,498,700 B2 * | 12/2002 | Takahashi et al. ........ 360/97.01 |
| 6,603,633 B2 * | 8/2003 | Heaton et al. ........... 360/97.02 |
| 6,608,732 B2 * | 8/2003 | Bernett et al. ........... 360/97.02 |

* cited by examiner

Primary Examiner—A. J. Heinz
Assistant Examiner—Angel Castro
(74) Attorney, Agent, or Firm—Merchant & Gould P.C.

(57) ABSTRACT

A disc drive device includes a base plate, a voice coil motor operably attached to the base plate, a top cover attached to the base plate with at least two perimeter fasteners and at least one interior fastener, wherein the two perimeter fasteners and the interior fastener form a triangular portion of the top cover therebetween, a pressure seal sealing the top cover and the base plate, and an acoustic damper contacting the voice coil motor and the triangular portion of the top cover for damping vibrations occurring in the voice coil motor and the top cover. The acoustic damper is made of the same material as the pressure seal. In this manner, vibrationally induced acoustical emissions from the disc drive device are reduced.

15 Claims, 6 Drawing Sheets

ACOUSTIC DAMPER FOR A DISC DRIVE

RELATED APPLICATIONS

This application claims priority of U.S. provisional application Ser. No. 60/324,395, filed Sep. 24, 2001.

FIELD OF THE INVENTION

The invention is generally directed to the field of disc drives and more particularly to controlling acoustic noise emissions emanating from a disc drive voice coil motor assembly while maintaining a sealed environment for the internal components of a disc drive.

BACKGROUND OF THE INVENTION

Modern disc drives comprise one or more discs that are coated with a magnetizable medium and mounted on the hub of a spindle motor for rotation at a constant high speed. Information is stored on the discs in a plurality of concentric circular tracks. Data is typically written to, and read from, the tracks via transducers ("heads") typically mounted to a radial actuator assembly, which positions the heads relative to the discs. Various disc drive components, including the spindle motor and the actuator assembly, are fastened to a base plate. A top cover is attached to the base plate and sealed with a pressure seal to enclose and create a sealed environment for the disc drive components. This sealed environment reduces the chance that outside contaminants, such as dust, will interfere with read/write operations of the actuator assembly, among other things.

Radial actuator assemblies employ a voice coil motor (VCM) to position the heads with respect to the disc surfaces. The heads are mounted via flexures at the ends of a plurality of actuator arms, which project radially outward from a substantially cylindrical actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Normally, the VCM includes a coil mounted on the side of the actuator body opposite the actuator arms between an array of permanent magnets which are positioned above and/or below the coil on top and/or bottom magnet plates or poles, respectively. When controlled current is passed through the coil, an electromagnetic field is generated. The generated electromagnetic field interacts with the magnetic field of the permanent magnets thus causing the coil to move relative to the magnets in accordance with the well-known Lorentz relationship. As the coil moves, the actuator body pivots about the pivot shaft and the heads are moved across the disc surfaces.

Typically, the heads are supported on the actuator arms in a position over the discs by actuator slider assemblies, which include air-bearing surfaces designed to interact with a thin layer of moving air generated by the rotation of the discs, so that the heads "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields on the data track and converts these flux transitions to a signal which is decoded by read channel circuitry of the disc drive.

A closed-loop servo system is typically used to control the position of the heads with respect to the disc surfaces. More particularly, during a track following mode in which a head is caused to follow a selected data track, servo information is read which provides a position error signal indicative of the position of the head relative to a center line of the track. The position error signal is used, when necessary, to generate a correction signal that in turn is provided to a power amplifier. The power amplifier then passes current through the actuator coil to adjust the position of the head relative to the track.

During a seek operation, the servo system receives the address of the destination track and generates control signals that cause the heads to initially accelerate and then subsequently decelerate as the head nears the destination track. At some point towards the end of the deceleration of the head, the servo system will transition to a settle mode during which the head is settled onto the destination track and, thereafter, the servo system causes the head to follow the destination track in a track following mode.

A general trend in the disc drive industry is to reduce the level of acoustic emissions or noise generated by disc drives, preferably reducing the noise to a level that is below the human hearing threshold. There are two primary sources of acoustic emissions or noise in disc drives: idle noise and seek noise. Idle noise results from the operation of the spindle motor and its associated rotating discs. Significant improvements in reducing idle noise have been achieved by replacing ball bearing assemblies with hydraulic bearings in the spindle motor. In contrast, seek noise results from vibrations in the permanent magnets and/or poles of the VCM caused when current is passed through the VCM coil. The vibrations occurring in the poles of the voice coil motor may be transmitted to the top cover and/or the disc drive base plate either as sympathetic vibrations or as direct transmissions.

Another trend in the disc drive industry is to reduce the weight of the disc drives for use in the lap top computers and other equipment that requires portability. Thus the designers of disk drives are faced with the task of reducing their weight while not sacrificing their robustness. One way to reduce the weight is by reducing the thickness of various components. Such reduction in thickness invariably reduces the stiffness of the parts. The decrease in weight of disc drives may cause problems with the integrity of the pressure seal between the top cover and the base plate because thinner top covers are more easily deformed.

One approach to reducing the seek noise from the disc drive has been to slow down the seek operation. A slowed down seek operational setting, called a quite seek, is often provided in disc drives as an optional setting. The alternative operational setting in disc drives having a quite seek setting is an operational setting commonly referred to as the performance seek, where the seek to the track occurs quickly relative to the quite seek. However, while the quite seek reduces the acoustical emissions from the disc drive, it also necessarily reduces disc drive performance. Disc drives including such quite seek operational settings are often employed in areas, such as government and private offices, that are subject to strict environmental noise limitations.

Another approach to reducing the acoustical emissions from the disc drive is to add a damping material between the upper magnetic plate or top pole and the top cover of the disc drive. For this approach to be effective, the top cover must be sufficiently rigid to provide deflection of the damping material. However, the stiffness required for this approach to be useful may add unacceptable weight and manufacturing costs to the disc drive. Further, if the cover is not sufficiently stiff, the addition of damping material between the cover and the top pole may cause the top cover to deform and breach the pressure seal between the cover and the base plate. Breach of this pressure seal allows contaminants into the disc drive and thus, may prevent the disc drive from operating effectively.

In addition to adversely affecting the integrity of the pressure seal, adding a damper between the top pole and the top cover may add significant costs to the manufacturing of the disc drive.

Accordingly there is a need for a damping system and/or method which effectively reduces VCM vibrations in a disc drive and, thereby, reduces acoustical emissions while at the same time does not adversely affect the integrity of the disc drive pressure seal or add significant costs to the manufacture of the disc drive.

SUMMARY OF THE INVENTION

Against this backdrop various embodiments of the present invention have been developed. In general, the various embodiments of the present invention relate to systems and methods of minimizing vibrationally induced noise in a disc drive servo system. Additionally, embodiments of the present invention relate to reducing vibrationally induced acoustical emissions from a disc drive device.

A disc drive has a base plate, a voice coil motor operably attached to the base plate, and a top cover attached to the base plate with two perimeter fasteners and one interior fastener through corresponding apertures in the top cover. The two perimeter fasteners/apertures and the interior fastener/aperture form a triangular portion of the top cover that has increased stiffness and rigidity due to the proximity of the fasteners to each other. A pressure seal is positioned between the top cover and the base plate to seal the disc drive to form an internal sealed environment for the various disc drive components. An acoustic damper is positioned between and contacts the voice coil motor and the triangular portion of the top cover to dampen vibrations occurring in the voice coil motor and the top cover. The acoustic damper is made of the same material as the pressure seal.

In another embodiment, a second acoustic damper is positioned between the base plate and the voice coil motor such that it does not contact the top cover. The second acoustic damper need not to be positioned within the triangle formed by the two perimeter fasteners and the interior fastener.

The voice coil motor includes a bottom pole attached to the base plate, a top pole operably connected to the bottom pole in a manner such that the top pole is maintained in a spaced relationship to the bottom pole, and a single magnet pair positioned between the top pole and the bottom pole. The first acoustic damper is preferably positioned between the top pole and the top cover and the second acoustic damper is preferably positioned between the bottom pole and the bottom cover.

In yet another embodiment of the present invention, a stiffening ridge is added to the top cover to create an isolated portion of the top cover over the top pole of the voice coil motor; the isolated portion is stiffer and more rigid than the remainder of the top cover. The isolated portion may be outside of the triangular portion, may partially overlap the triangular portion, or may be contained entirely within the triangular portion. The acoustic damper may be positioned between the isolated portion and the voice coil motor to dampen acoustic noise without adversely affecting the integrity of the pressure seal.

The disc drive is manufactured by operably attaching the voice coil motor to the base plate and then attaching the top cover to the base plate using at least the two perimeter fasteners and the interior fastener. A pressure seal is positioned between and contacts the top cover and the base plate and an acoustic damper is positioned between and contacts the voice coil motor and the triangular portion of the top cover. The pressure seal and acoustic damper may be applied to the top cover prior to attaching the cover to the base plate or applied to the base plate and the voice coil motor, respectively prior to attaching the cover to the base plate. The same process is preferably used to apply the acoustic damper as to position the pressure seal which adds little or no additional cost to the manufacture of the disc drive.

These and various other features as well as advantages which characterize the various embodiments of the present invention will be apparent from a reading of the following detailed description, a review of the associated drawings, and the appended claims.

DETAILED DESCRIPTION

In general, the present disclosure describes methods and systems for dampening vibrations in, and acoustical emissions from, a disc drive device. More particularly, the present disclosure describes a system and method for reducing vibrational modes induced in and by a disc drive voice coil motor (VCM), referred to herein as "seek noise."

Figure 1:
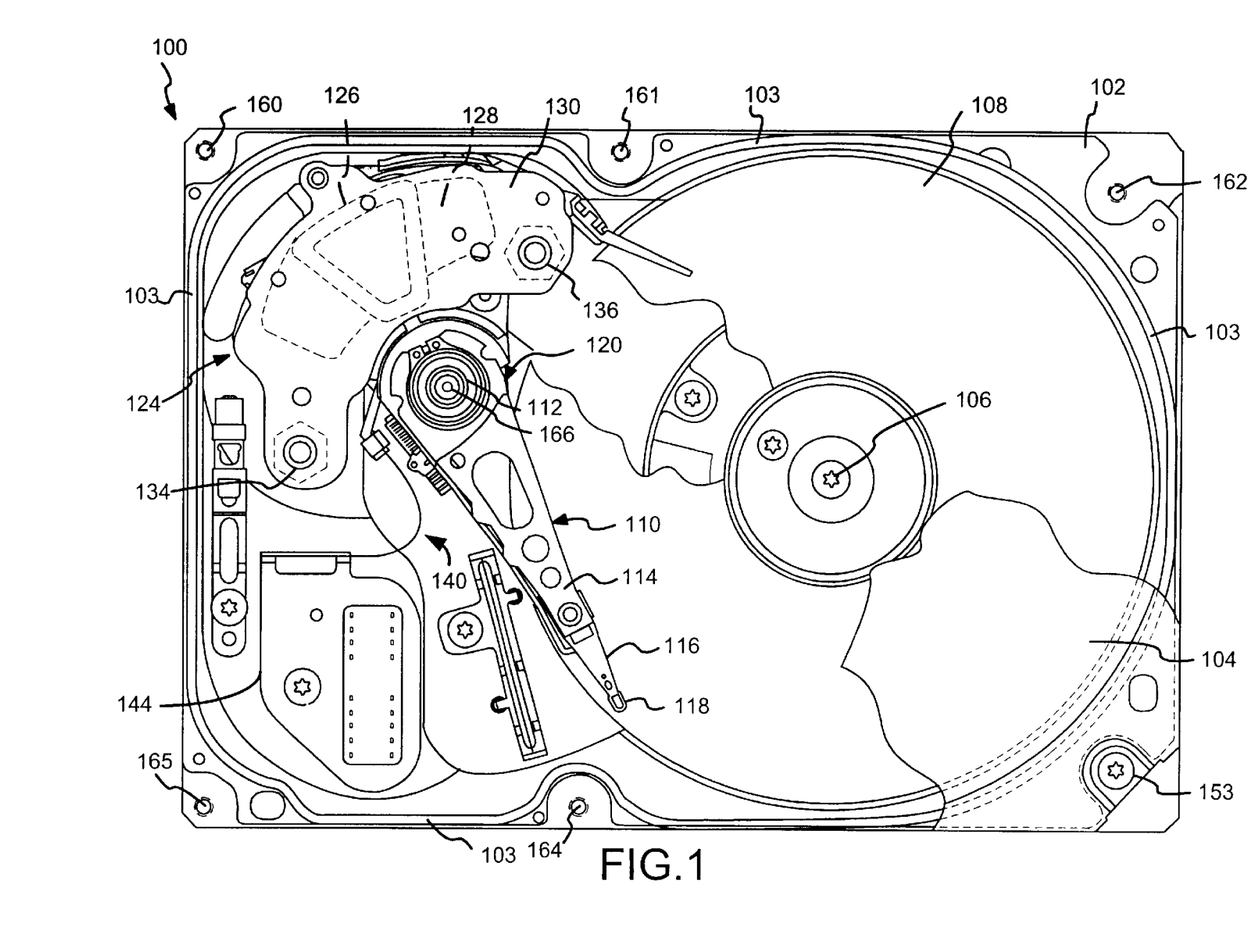
FIG. 1 is a top view of a disc drive showing the primary internal disc drive components, with the cover shown partially cutaway.

Referring to FIG. 1, a disc drive 100 in which the methods and system of the present invention may be practiced is shown. The disc drive 100 includes a base plate 102 to which various components of the disc drive 100 are mounted. A top cover 104, shown partially cut away in FIG. 1, is mounted to the base plate 102 with a series of six perimeter fasteners 150–155, such as screws, through six perimeter apertures 160–165 in the cover 104 and one interior screw 156 through one interior aperture 166 in the top cover 104. A pressure seal 103, applied to a perimeter of the top cover 104, seals the top cover 104 to the base plate 102 to form an internal, sealed environment for the disc drive components when the top cover 104 is attached to the base plate 102. Alternatively, the pressure seal 103 may be first applied to a perimeter of the base plate 102 as opposed to the top cover 104. The disc drive components contained within the sealed disc drive include a spindle motor 106, one or more discs 108, and an actuator assembly 110. The spindle motor 106 rotates the discs 108 at a constant high speed. Information is written to and read from tracks on the discs 108 through the use of the actuator assembly 110, which rotates during a seek operation about a bearing shaft assembly 112 positioned adjacent the discs 108.

The actuator assembly 110 includes a plurality of actuator arms 114 which extend toward and over the discs 108, with one or more flexures 116 extending from each of the actuator arms 114. Mounted at the distal end of each of the flexures 116 is a head 118 which includes an air bearing slider (not shown) that enables the head 118 to fly in close proximity to a corresponding surface of an associated disc 108.

During a seek operation, the track position of the heads 118 is controlled through the use of a voice coil motor (VCM) 124, which typically includes a coil 126 attached to the actuator assembly 110, a top pole 130, a bottom pole 132 (FIG. 4), as well as one or more permanent magnet pairs 128, positioned between the top pole 130 and the bottom pole 132, which establish a magnetic field in which the coil 126 is immersed. The bottom pole 132 (shown in FIG. 5) is attached to the base plate 102 and the top pole 130 is operably connected to the bottom pole 132 and/or base plate 102 in spaced relation to the bottom pole 132 with a first screw 134. An additional second screw 136 may be used to fasten an opposite side of the top pole 130 to the bottom pole 132 and/or base plate 102. The controlled application of current to the coil 126 causes magnetic interaction between the magnet pair(s) 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

A flex assembly 140 provides the requisite electrical connection paths for the actuator assembly 110 while allowing pivotal movement of the actuator assembly 110 during operation. The flex assembly typically includes circuitry to which head wires (not shown) are connected. The head wires are routed along the actuator arms 114 and the flexures 116 to the heads 118. The flex assembly circuitry typically controls the write currents applied to the heads 118 during a write operation and amplifies read signals generated by the heads 118 during a read operation. The flex assembly 140 terminates at a flex bracket 144 for communication through the base plate 102 to a disc drive printed circuit board (not shown) mounted to the bottom side of the disc drive 100.

Figure 2:
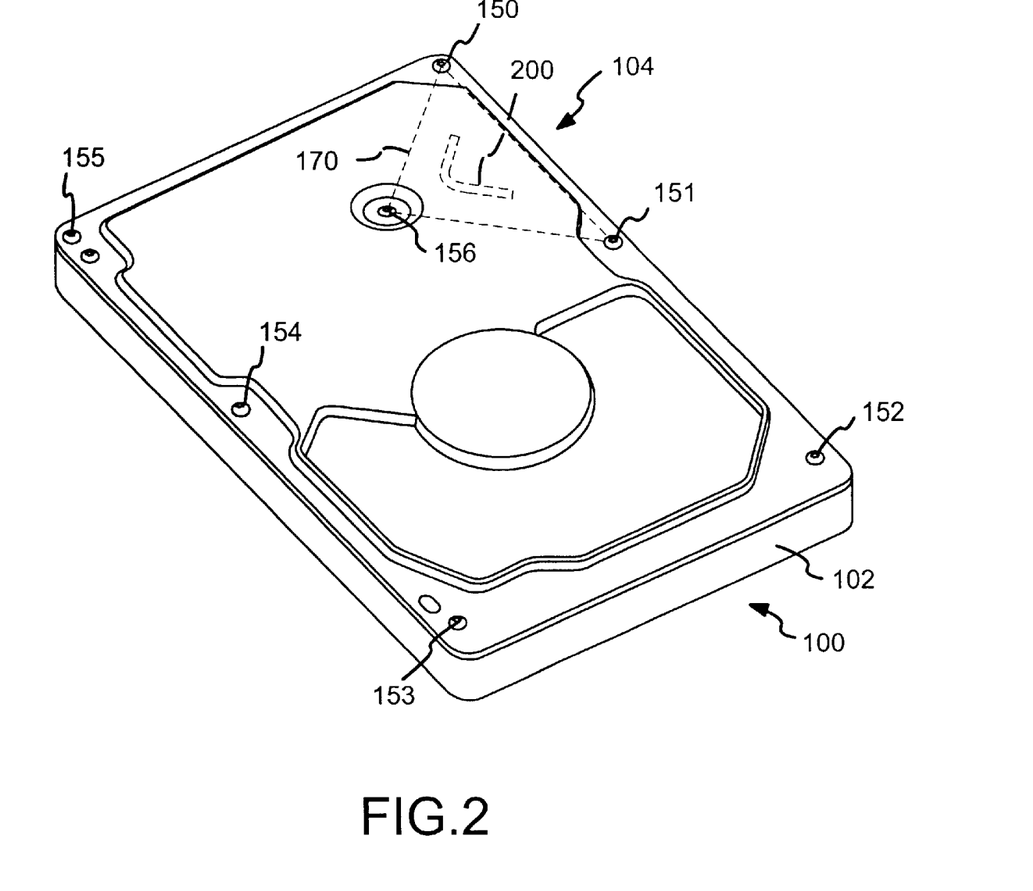
FIG. 2 is top plan view of the disc drive of FIG. 1 with a top cover incorporating an acoustic damper (shown in shadow) in accordance with an embodiment of the present invention.

FIG. 2 shows a plan view of a disc drive with the top cover 104 attached. The screws 150, 151, and 156 and/or apertures 160, 161, and 166 (shown in FIG. 6) define three points of a triangular portion 170 of the top cover 104. When the cover 104 is attached tightly to the base plate via the screws 150–156, the triangular portion 170 of the top cover 104 becomes more stiff and rigid and more resistant to deformation than the remaining portion of the cover 104. This additional stiffness is due in part to the strength added by the close proximity of the screws 150, 151, and 156 to each other. While the interior screw 156 is shown mounted through the center of the bearing shaft assembly 112 (shown in FIG. 1), it may be mounted anywhere inside of the perimeter of the top cover 104 so long as it is close enough to the screws 150 and 151 to increase the stiffness of the triangular portion 170. An acoustic damper 200 (shown by dashed lines in FIG. 2) is positioned between the top cover 104 and the top pole 130 such that the acoustic damper contacts the top cover 104 within the triangular portion 170.

Figure 3:
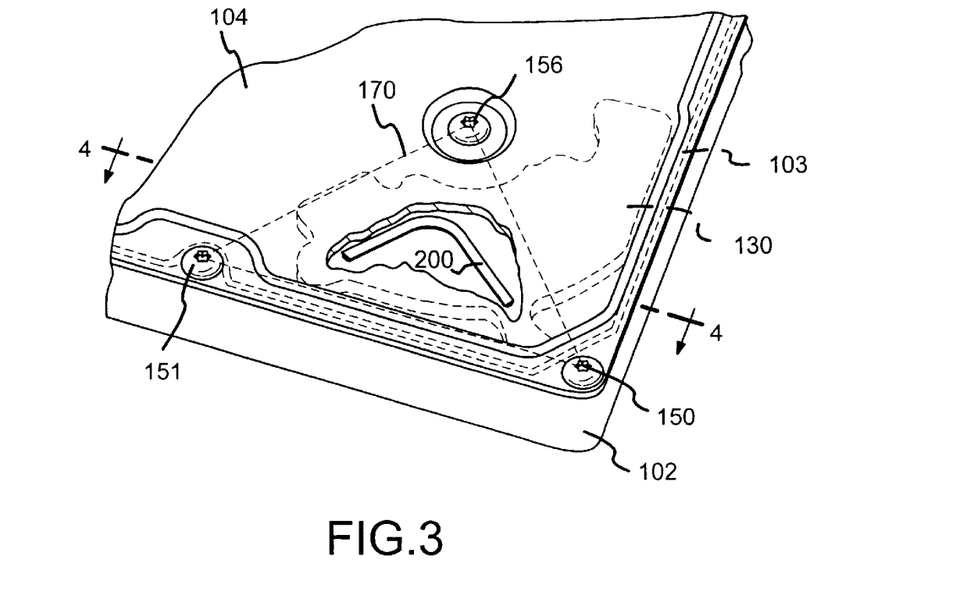
FIG. 3 is a top view of the disc drive of FIG. 2 with the cover shown partially cutaway to expose the acoustic damper.
Figure 4:
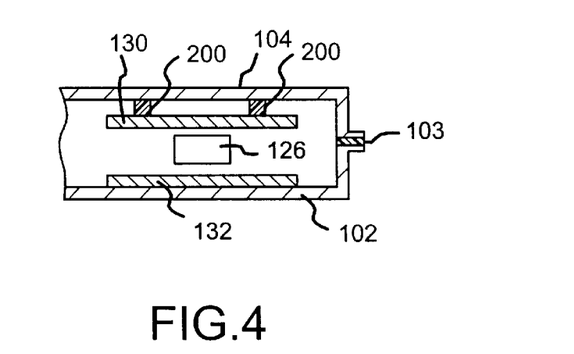
FIG. 4 is cross-sectional view through lines 4—4 of FIG. 3.

FIG. 3 illustrates a top view of the disc drive shown in FIG. 1 with the cover 104 partially cutaway to expose the acoustic damper 200. FIG. 4 shows a cross sectional view along line 4—4 of FIG. 3. As best seen in FIG. 4, the triangular portion 170 of the top cover 104 exerts pressure on the acoustic damper 200 thereby allowing the acoustic damper 200 to dampen acoustic vibrations in the top pole 130 caused by seek noise, thereby preventing vibrations from passing through the top cover 104. The addition of the acoustic damper 200 within the triangular portion 170 will not cause the top cover 104 to deform and breach in the pressure seal 103 because the triangular portion 170 has extra stiffness or rigidity due in part to the location of the screws 150, 151, and 156. In other words, the pressure exerted by the acoustic damper 200 on the triangular portion 170 will not cause the remaining portion of the top cover 104 to deform because the triangular portion 170 is stiff enough to endure this pressure. In this way, the acoustic damper 200 does not affect the integrity of the pressure seal 103. The acoustic damper 200 is made of a damping material, such as, vicsoelastic damping material, fluoroelastomer damping material, polyurethane elastomers, rubber, fluorocarbon elastomers, epoxy thermoset elastomers, ethylene-Propylene (EPDM), BUNA-N (Nitrile) (NBR), silicone elastomers, neoprene (synthetic rubber), or fluorosilicone elastomers. The acoustic damper 200 is made of the same material as the pressure seal 103 and is preferably applied to an interior surface of the top cover 104 using the same process that is used to apply the pressure seal 103 to the interior surface of the top cover 104. If the acoustic damper 200 is applied within the triangular portion 170 of the top cover 104 at the same time as the pressure seal 103 and using the same material as the pressure seal 103, there will be little or no extra cost associated with the addition of acoustic damper 200.

Various methods may be used to apply the acoustic damper 200 to the triangular portion 170 of the cover 104 and/or the top pole 130, including without limitation, dispensing or applying the acoustic damper 200 as an elastomer bead followed by one or more curing processes; directly molding the acoustic damper 200 on the cover; molding the acoustic damper 200 separately (either stand alone or on a backbone or substrate), which results in the seal becoming a separate part for placement between the cover and voice coil motor; or a process involving molding and/or extruding the acoustic damper 200 in a three-dimensional piece followed by slicing process to produce each individual acoustic damper 200, which would then be attached to the cover 104 and/or the voice coil motor 124 using adhesive. These same methods may be used to position the pressure seal 103 between the top cover 104 and the base plate 102.

Figure 6:
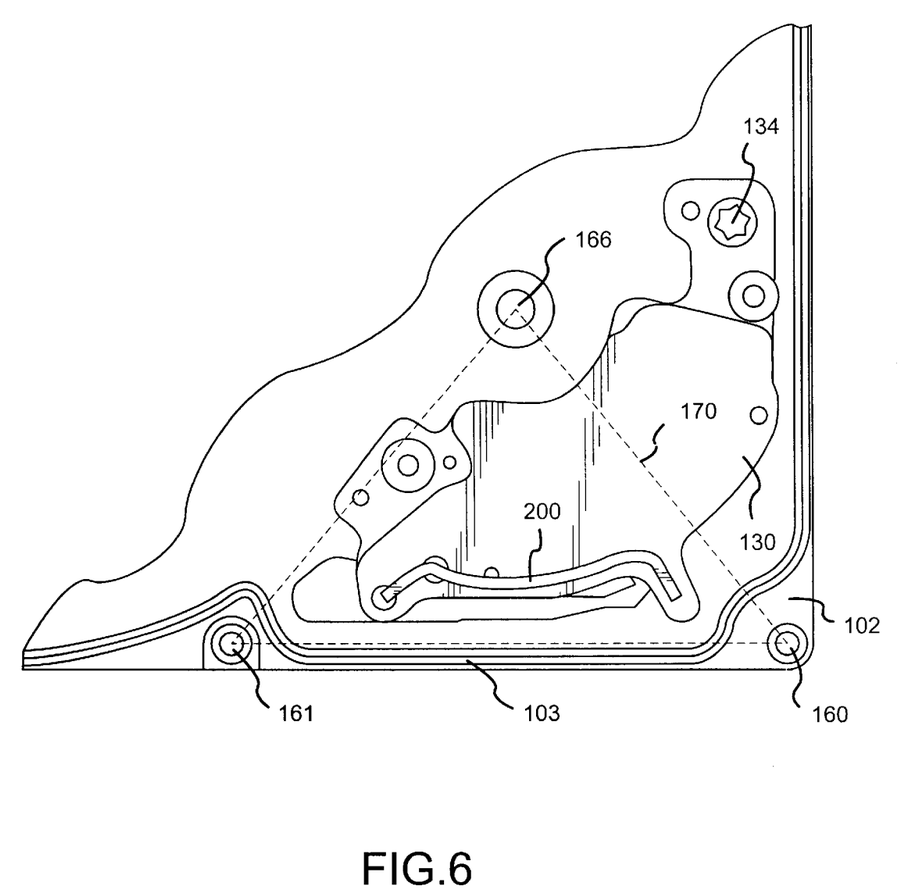
FIG. 6 is a top view of a disc drive incorporating another embodiment of the present invention before the top cover is attached.
Figure 7:
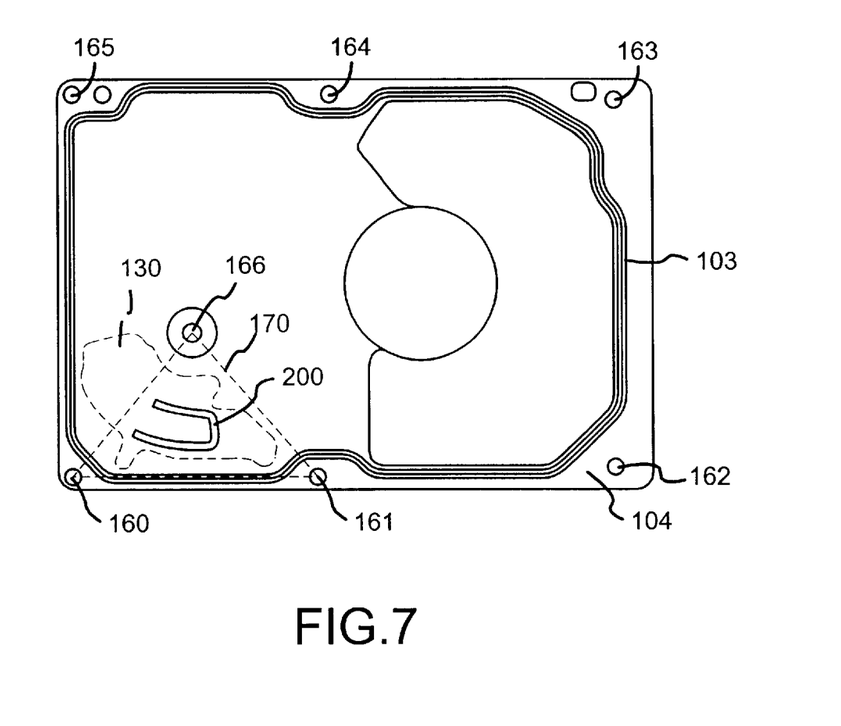
FIG. 7 is a bottom plan view of a top cover incorporating another embodiment of the present invention, with the position of the top pole shown in shadow.
Figure 8:
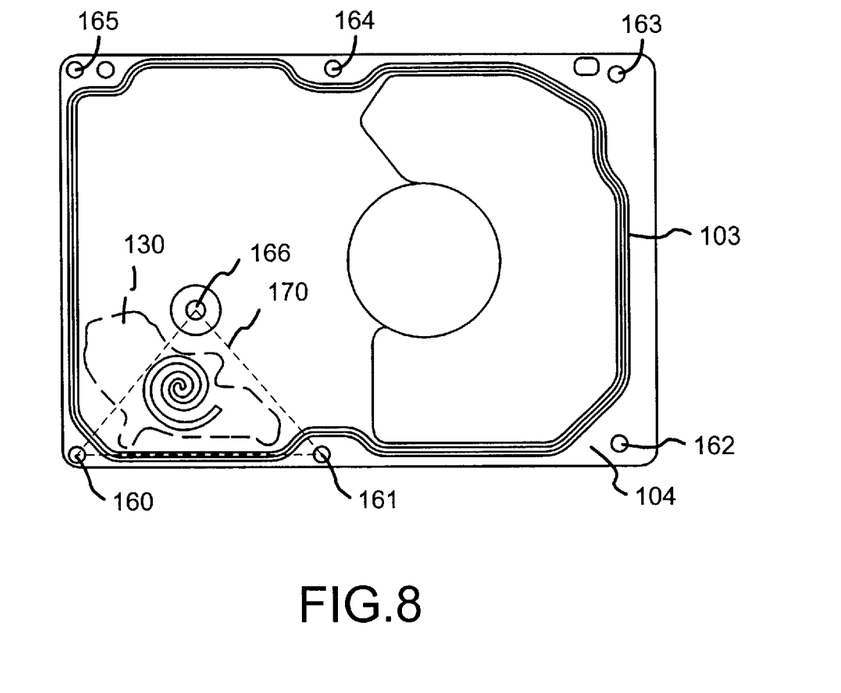
FIG. 8 is a bottom plan view of a top cover incorporating another embodiment of the present invention, with the position of the top pole shown in shadow.

During disc drive manufacture, the acoustic damper 200 may be applied to the top cover 104 prior to engaging it with the top pole 130, which will happen when the cover is attached to the base plate 102 as shown in FIGS. 7 and 8. Or the acoustic damper 200 may be applied to the top pole 130 prior to engaging it with the top cover 104 when the top cover 104 is attached to the base plate 102 as shown in FIG. 6.

The acoustic damper 200 may be made of any shape, including without limitation, a rounded V-shape (FIG. 3), a wavy line (FIG. 6), a U-shape (FIG. 7), and a spiral (FIG. 8) so long as the acoustic damper 200 is contained within the triangular portion 170. As has been discovered by the inventors of the present invention, generally the more surface area of the top pole 130 that acoustic damper 200 touches, the better that the acoustic damper 200 will dampen the seek noise. Also as a general rule, the more spaced that the acoustic damper 200 is from the screws 134 and 136 fastening the voice coil motor to base plate, the better that the acoustic damper 200 will dampen the seek noise. So for example, if the VCM 124 is fastened to the base plate 102 with a single screw 134, the acoustic damper 200 will dampen more seek noise if it is positioned in the farthest point from screw 134 within the triangular portion 170. If the VCM 124 is fasted with two screws 134 and 136, then the acoustic damper 200 will dampen more seek noise if it is positioned equidistant from the two screws 134 and 136 while still being positioned within the triangle portion 170.

Typically, the more pressure exerted between the acoustic damper 200 and the triangular portion 170, the better that the acoustic damper 200 will dampen the seek noise. Pressure preferably ranges in the amount of a few psi to several hundred psi. If the top pole 130 is attached to the base plate by only the first screw 134, then the acoustic damper will have better damping effect the farther it is located away from the screw 134.

Figure 5:
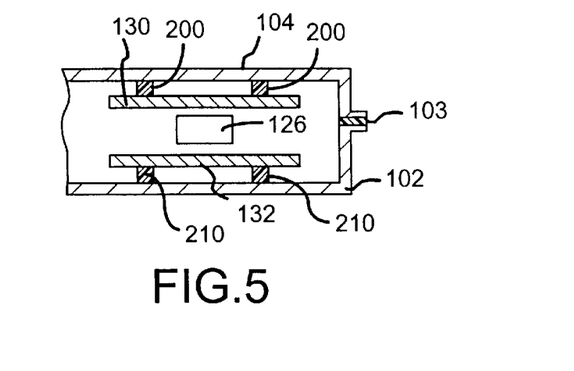
FIG. 5 is cross-sectional view of an alternative embodiment of the present invention incorporating an acoustic damper contacting the top cover and top pole and an acoustic damper contacting the base plate and the bottom pole.

FIG. 5 shows another embodiment of the present invention including a second acoustic damper 210 positioned between and contacting the bottom pole 132 and the base plate 102. The acoustic damper 210 further reduces seek noise by damping the vibrations of the bottom pole 132 and preventing transmission of these vibrations to the base plate 102. The second acoustic damper 210 may be made of the same material as the acoustic damper 200 and the pressure seal 103, thereby adding almost no additional cost to the disc drive manufacture. More preferably, the acoustic damper 210 is applied to the base plate 102 and the bottom pole 132 using the same process as is used to apply the acoustic damper 200 to the top cover 104 and the top pole 130, thereby adding no additional manufacturing costs. Because the acoustic damper 210 does not contact the top cover 104, it may be positioned anywhere, so long as it makes contact with the bottom pole 132 and the base plate 102.

Figure 9:
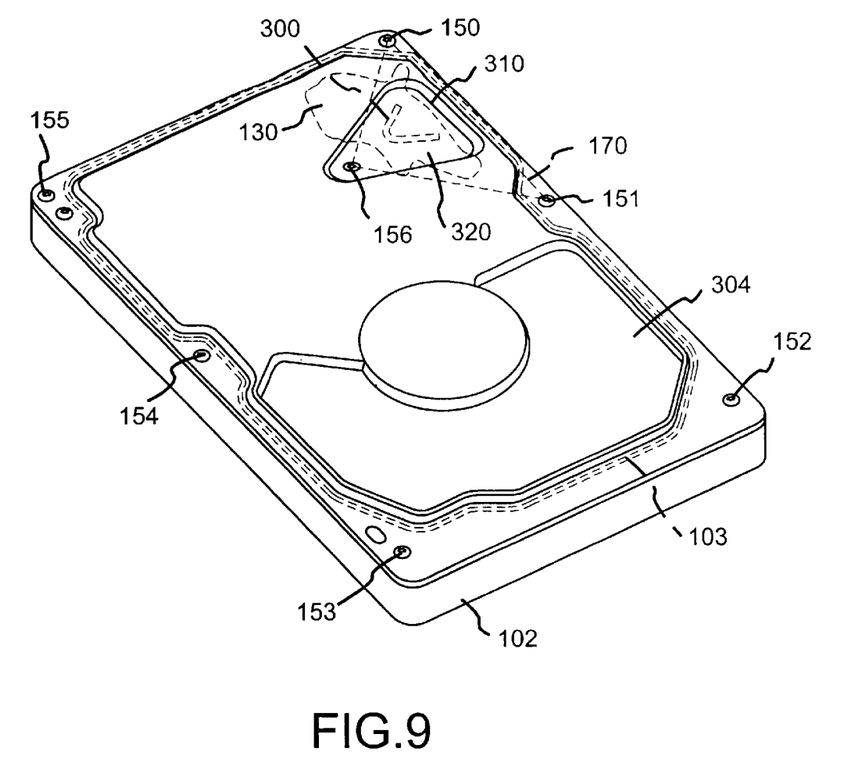
FIG. 9 is top plan view of the disc drive with a top cover incorporating yet another embodiment of the present invention.
Figure 10:
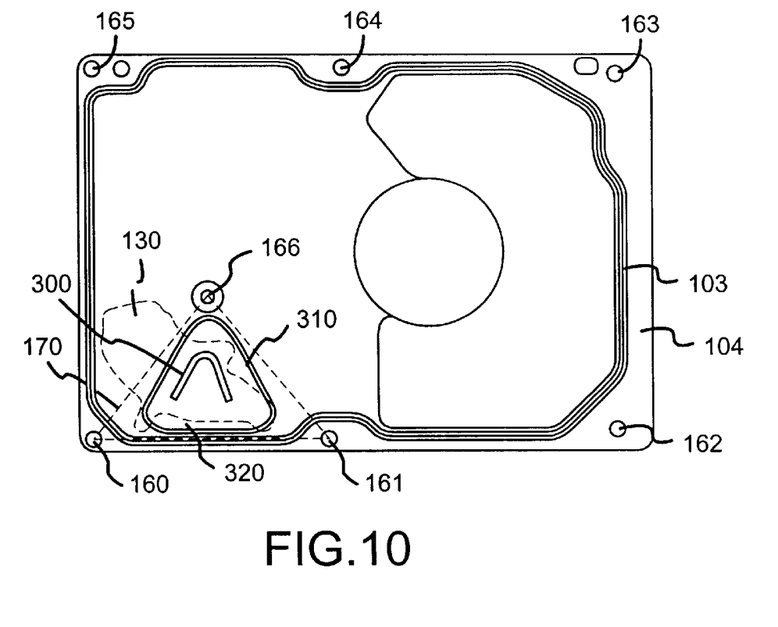
FIG. 10 is a bottom plan view of a top cover incorporating another embodiment of the present invention, with the position of the top pole shown in shadow.

FIGS. 9 and 10 show another embodiment of the present invention designed to be used with lightweight disc drives, for example for use with mobile computers such as lap tops. A top cover 304 is made of a lightweight material, such as aluminum. Aluminum is lighter than steel and is used to reduce the overall weight of disc drives. However, while aluminum is lightweight, typically it lacks the stiffness or rigidity of heavier materials, such as steel. Because aluminum lacks the rigidity of steel, an addition of damping material between the cover 304 and the top pole 130, even within the triangular portion 170 of the cover 304 may increase the risk of deforming the cover 304 thereby causing a breach of the pressure seal 103. As has been discovered by the inventors of the present invention, a stiffening ridge 310 may be added to the cover 304, which increases the rigidity of the cover within a portion 320 of the cover 304 surrounded by the ridge 310. Preferably the stiffening ridge 310 is continuous such that it defines the portion 320 that is isolated from the remainder of the cover 304. The stiffening ridge 310 may be any shape, including without limitation, a circle, a triangle, square, rectangle, or the like. In this way, the stiffening ridge 310 isolates the portion 320 from the cover 304 to make a smaller area, which is more rigid than the cover 304. The stiffening ridge 310 may be any depth so long as it does not add unnecessary height to the disc drive 100. The area 320 is made additionally stiff if it is positioned at least partially within or overlapping the triangular portion 170 of the top cover 304 as is shown in FIG. 9 or contained entirely with the triangular portion 170 as shown in FIG. 10.

An acoustic damper 300, just like the acoustic damper 200, is positioned within the isolated portion 320 of the cover 304 between the cover 304 and the top pole 130. The addition of the acoustic damper 300 within the isolated portion 320 will not cause a breach in the pressure seal 103 around the perimeter of the disc drive 100 because the portion 320 has extra stiffness or rigidity and is isolated from the cover 304 by the stiffening ridge 310. Preferably, the isolated portion 320 is indented within the cover 304 as shown in FIG. 9 to allow it to exert additional pressure on the acoustic damper 300 thereby increasing the dampening effect of the acoustic damper 300. Just like acoustic damper 200, the acoustic damper may be added to the cover 304 first or to the top pole 130 first.

Alternatively described, the disc drive (such as 100) includes the base plate (such as 102), the voice coil motor (such as 124) operably attached to the base plate (such as 102), the top cover (such as 104) attached to the base plate (such as 102) with perimeter fasteners (such as 160–165) and one interior fastener (such as 166) through corresponding perimeter apertures (such as 150–155) and one interior aperture (such as 156) in the top cover (such as 104) and the base plate (such as 102), wherein two perimeter fasteners (such as 160 and 161) and two perimeter apertures (such as 150 and 151) and the interior fastener (such as 166) and interior aperture (such as 156) form the triangular portion (such as 170) of the top cover (such as 104), and the pressure seal (such as 103) formed of a material positioned between the top cover (such as 104) and the base plate (such as 102). The first acoustic damper (such as 200 or 300) is positioned between and contacting the voice coil motor (such as 124) and the triangular portion (such as 170) of the top cover (such as 104) for damping vibrations occurring in the voice coil motor (such as 124) and the top cover (such as 104). The first acoustic damper (such as 200 or 300) comprises the same material as the pressure seal (such as 103). The voice coil motor (such as 124) includes the bottom pole (such as 132) attached to the base plate (such as 102) and the top pole (such as 130) operably connected to the bottom pole (such as 132) in a manner such that the top pole (such as 130) is maintained in a spaced relationship to the bottom pole (such as 132). The first acoustic damper (such as 200 or 300) contacts the top pole (such as 130) and the triangular portion (such as 170) of the top cover (such as 104). The pressure seal (such as 103) and the first acoustic damper (such as 200 or 300) may be made of many different materials, including fluoroelastomer damping material or viscoelastic damping material. The first acoustic damper (such as 200 or 300) may be adhesively attached to the triangular portion (such as 170) of the top cover (such as 104) or the voice coil motor (such as 124). The first acoustic damper (such as 200 or 300) may be many shapes including a U-shape or a spiral shape. The first acoustic damper (such as 200 or 300) may be centered within the triangular portion (such as 170) of the top cover (such as 104).

The second acoustic damper (such as 210) may be positioned between and contacting the voice coil motor (such as 124) or bottom pole (such as 132) and the base plate (such as 102) for damping vibrations occurring in the voice coil motor (such as 124) and the base plate (such as 102). The second acoustic damper (such as 210) comprises the same material as the pressure seal (such as 103).

The disc drive (such as 100) may include a stiffening ridge (such as 310) in the top cover (such as 104) that defines the isolated portion (such as 320), wherein the stiffening ridge (such as 310) overlaps the triangular portion (such as 170) of the top cover (such as 104) and may be contained entirely within the triangular portion (such as 170) of the top cover (such as 104). The first acoustic damper (such as 200 or 300) may contact the isolated portion (such as 320) of the top cover (such as 104).

The disc drive (such as 100) is manufactured by operably attaching the voice coil motor (such as 124) to the base plate (such as 102), positioning the pressure seal (such as 103) made of a material around the periphery of one of the top cover (such as 104) or the base plate (such as 102), applying the first acoustic damper (such as 200 or 300) made of the same material as the pressure seal (such as 103) to one of the triangular portion (such as 170) of the top cover (such as 104) or the voice coil motor (such as 124), and attaching the top cover (such as 104) to the base plate (such as 102) with the two perimeter fasteners (such as 160 and 161) through the two perimeter apertures (such as 160 and 161) and the interior fastener (such as 166) through the interior aperture (such as 156). The pressure seal (such as 103) may be positioned using the same process as is used to apply the first acoustic damper (such as 200 or 300). The first acoustic damper (such as 200 or 300) may be applied using various processes including applying it as an elastomer bead followed by curing, directly molding it to one of the top cover (such as 104) or the voice coil motor (such as 124), or molding it separately from the top cover (such as 104) or the voice coil motor (such as 124) and then attaching it to one of the top cover (such as 104) or the voice coil motor (such as 124) with adhesive. The pressure seal (such as 103) may be positioned as the same time as the acoustic seals (such as 200, 210, or 300) are applied. A second acoustic damper (such as 210) made of the same material as the pressure seal (such as 103) may be applied to one of the base plate (such as 102) or the voice coil motor (such as 124).

A disc drive (such as 100) damping system has a base plate (such as 102), a voice coil motor (such as 124) connected to the base plate (such as 102), a top cover (such as 104) attached to the base plate (such as 102), and a first damping means positioned between and contacting the triangular portion (such as 170) of the top cover (such as 104) and the voice coil motor (such as 124) for damping vibrations in the disc drive (such as 100). A pressure seal (such as 103) is positioned between the top cover (such as 104) and the base plate (such as 102). A second damping means (such as 210) may be positioned between the base plate (such as 102) and the voice coil motor (such as 124) for damping vibrations in the disc drive (such as 100).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, while the various embodiments above discuss the benefits of the present invention with respect to disc drives employing a single lower magnet pair, the present invention may also be used with respect to disc drives having other magnet pair arrangements. For instance, the present invention may be employed in disc drives employing a single magnet pair located on the upper magnet plate or in disc drives having magnet pairs located on both the upper and lower magnet plates. Numerous other changes may be made which will readily suggest themselves to those skilled in the art and which are encompassed in the scope of the invention disclosed and as defined in the appended claims.

What is claimed is:

1. A disc drive comprising:
   a base plate;
   a voice coil motor operably attached to the base plate;
   a top cover attached to the base plate with perimeter fasteners and one interior fastener, wherein two perimeter fasteners and the interior fastener form a triangular portion of the top cover;
   a pressure seal formed of a material positioned between the top cover and the base plate; and
   a first acoustic damper wholly within the triangular portion and positioned between and contacting the voice coil motor and the triangular portion of the top cover, wherein the acoustic damper comprises the same material as the pressure seal.

2. The disc drive of claim 1, wherein the voice coil motor comprises:
   a bottom pole attached to the base plate; and
   a top pole operably connected to the bottom pole in a manner such that the top pole is maintained in a spaced relationship to the bottom pole, wherein the first acoustic damper contacts the top pole and the triangular portion of the top cover.

3. The disc drive of claim 1, wherein the pressure seal and the acoustic damper comprise a fluoroelastomer damping material.

4. The disc drive of claim 1, wherein the pressure seal and the acoustic damper comprise a viscoelastic damping material.

5. The disc drive of claim 1, wherein the acoustic damper is adhesively attached to the triangular portion of the top cover.

6. The disc drive of claim 1, wherein the acoustic damper is adhesively attached to the voice coil motor.

7. The disc drive of claim 1, further comprising:
   a second acoustic damper positioned between and contacting the voice coil motor and the base plate.

8. The disc drive of claim 7, further comprising:
   a bottom pole attached to the base plate; and
   a top pole operably connected to the bottom pole in a manner such that the top pole is maintained in a spaced relationship to the bottom pole, wherein the first acoustic damper contacts top pole and the triangular portion of the top cover, and wherein the second acoustic damper contacts the bottom pole and the base plate.

9. The disc drive of claim 1, wherein the acoustic damper is centered within the triangular portion of the top cover.

10. A disc drive comprising:
    a base plate;
    a voice coil motor operably attached to the base plate;
    a top cover attached to the base plate with perimeter fasteners and one interior fastener, wherein two perimeter fasteners and the interior fastener form a triangular portion of the top cover;
    a pressure seal formed of a material positioned between the top cover and the base plate;
    a first acoustic damper positioned between and contacting the voice coil motor and the triangular portion of the top cover, wherein the acoustic damper comprises the same material as the pressure seal, and;

a stiffening ridge in the top cover defining an isolated portion, wherein the stiffening ridge overlaps the triangular portion of the top cover and the acoustic damper contacts the isolated portion of the top cover.

11. The disc drive of claim 10, wherein the isolated portion is contained entirely within the triangular portion of the top cover.

12. A disc drive damping system comprising:

a disc drive having a base plate, a voice coil motor connected to the base plate, and a top cover attached to the base plate with two perimeter fasteners and one interior fastener forming a triangular portion of the top cover therebetween; and a first damping means positioned wholly within the triangular portion and positioned between and contacting the triangular portion of the top cover and the voice coil motor for damping vibrations in the disc drive.

13. The disc drive damping system of claim 12, further comprising a pressure seal positioned between the top cover and the base plate.

14. The disc drive damping system of claim 12, further comprising a second damping means positioned between the base plate and the voice coil motor for damping vibrations the disc drive.

15. The disc drive damping system of claim 12, further comprising:

a bottom pole attached to the base plate; and a top pole operably connected to the bottom pole in a manner such that the top pole is maintained in a spaced relationship to the bottom pole, wherein the first damping means contacts the top pole and the triangular portion of the of the top cover.

* * * * *